(12) United States Patent
Pastor

(10) Patent No.: US 6,710,901 B2
(45) Date of Patent: Mar. 23, 2004

(54) METHOD AND APPARATUS FOR TWO-PHOTON, VOLUMETRIC SPATIALLY RESOLVED HOLOGRAPHIC DATA STORAGE IN PHOTOSENSITIVE GLASS

(75) Inventor: Alexander Pastor, St. Petersburg (RU)

(73) Assignee: Canadian Production Promotion Group Inc., Thornhill (CA)

( * ) Notice: Subject to any disclaimer, the term of this patent is extended or adjusted under 35 U.S.C. 154(b) by 0 days.

(21) Appl. No.: 09/985,264

(22) Filed: Nov. 2, 2001

(65) Prior Publication Data

US 2003/0086137 A1 May 8, 2003

(51) Int. Cl.[7] .............................. G03H 1/04; G03H 1/16; G03H 1/28; G11C 13/04

(52) U.S. Cl. ................................ 359/4; 359/3; 359/21; 359/24; 359/29; 359/35; 359/900; 365/125; 365/216

(58) Field of Search ............................. 359/3, 4, 35, 21, 359/29, 900, 24

(56) References Cited

U.S. PATENT DOCUMENTS

| | | | | |
|---|---|---|---|---|
| 5,283,777 A | * | 2/1994 | Tanno et al. | 369/108 |
| 5,812,288 A | * | 9/1998 | Curtis et al. | 359/21 |
| 6,483,735 B1 | * | 11/2002 | Rentzepis | 365/119 |
| 6,586,141 B1 | * | 7/2003 | Efimov et al. | 430/1 |
| 2002/0045104 A1 | * | 4/2002 | Efimov et al. | 430/2 |
| 2002/0126333 A1 | * | 9/2002 | Hosono et al. | 359/35 |

FOREIGN PATENT DOCUMENTS

| | | | |
|---|---|---|---|
| CA | 2362655 A1 | * | 6/2001 |
| JP | 10-268364 A | * | 10/1998 |
| WO | WO 01/44879 A1 | * | 6/2001 |

OTHER PUBLICATIONS

D. Psaltis, et al., "Holographic Memories", Scientific American vol. 273, Issue 5, p. 70, 7p., Nov. 1995.*
Oleg. M. Efimov, et al., "High–efficiency Bragg gratings in photothermorefractive glass", Appl. Opt. vol. 38, No. 4, pp. 619–627, Feb. 1, 1999.*
L.B. Glebov, et al., "Photo–Induced Processes in Photo–Thermo–Refractive Glasses", Proc. XVIII Int'l Congress on Glass, San Francisco, CA Jul. 5–10, 1998, pp. 1151–1156. American Ceramic Soc.*
A.S. Dvornikov, et al., "Advances in 3D Two–Photon Optical Storage Devices", 1998 Int'l Non–Volatile Memory Conf., pp. 68–71, IEEE 1998.*

(List continued on next page.)

Primary Examiner—John Juba, Jr.
(74) Attorney, Agent, or Firm—Edward Langer, Pat. Atty.; Shiboleth, Yisraeli, Roberts, Zisman & Co.

(57) ABSTRACT

A method for the generation of volume spatially-resolved holographic data storage within a photosensitive glass sample that incurs changes of optical properties in response to two-photon absorption, the method including directing non-ultraviolet pulsed laser radiation at the photosensitive glass sample to induce changes of optical properties in the glass sample, splitting of the pulsed laser radiation, prior to reaching the glass sample, into an object beam having a direct optical path of a first predetermined length and a reference beam, changing the path of the reference beam to have an indirect optical path of a second pre-determined length, focusing each of the object beam and the reference beam along the respective optical paths, to intersect at a focal volume of the glass sample, and therein to cause the two-photon absorption, providing a variable time delay in the direct path of the object beam so that it reaches the chosen region within the focal volume of glass at the same time as the reference beam, thereby realizing the spatially-resolved writing of holograms and heating of the sample to a temperature necessary and sufficient to cause the changes of optical properties.

11 Claims, 3 Drawing Sheets

OTHER PUBLICATIONS

L.B. Glebov, et al., "New ways to use photosensitive glasses for recording volume phase holograms", Opt. Spectrosc. 73(2), pp. 237–241, Aug. 1992.*

N.F. Borrelli, et al., "Photolytic technique for producing microlenses in photosensitive glass", Appl. Optics. vol. 24, No. 16, pp. 2520–2525, Aug. 15, 1985.*

L.B. Glebov, et al., "Photochromic glasses—a new material for recording volume phase holograms", Sov. Phys. Dokl. 35 (Oct. 10, 1990), pp. 878–880, Amer. Inst. Phys.*

V.A. Borgman, et al., "Photothermal reflective effect in silicate glasses", Sov. Phys. Dokl. 34 (Nov. 1989), pp. 1011–1013.*

A.S. Dvornikov, et al., "Materials and Systems for Two Photon 3–D ROM Devices", IEEE Trans. Comp., Pkg., and Mfg. Techn., Part A, vol. 20, No. 2, Jun. 1997, pp. 203–212.*

PTO 03–4224, "Production Method and Device for Hologram" English language translation of WO 01/44879 A1 to Hideo Hosono, et al. Ralph McElroy Translation Company, Washington, DC Jul. 2003.*

* cited by examiner

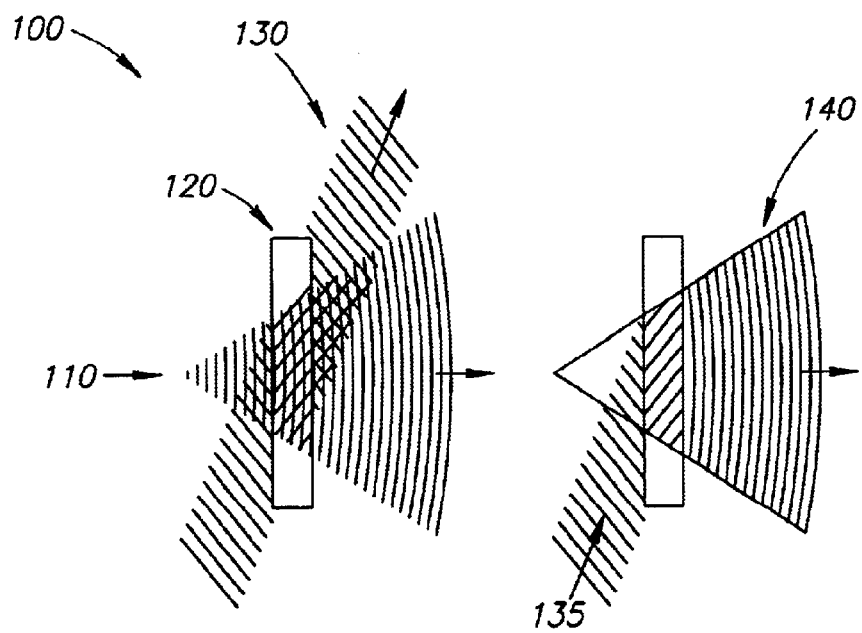
FIG.1A
PRIOR ART
FIG.1B
PRIOR ART
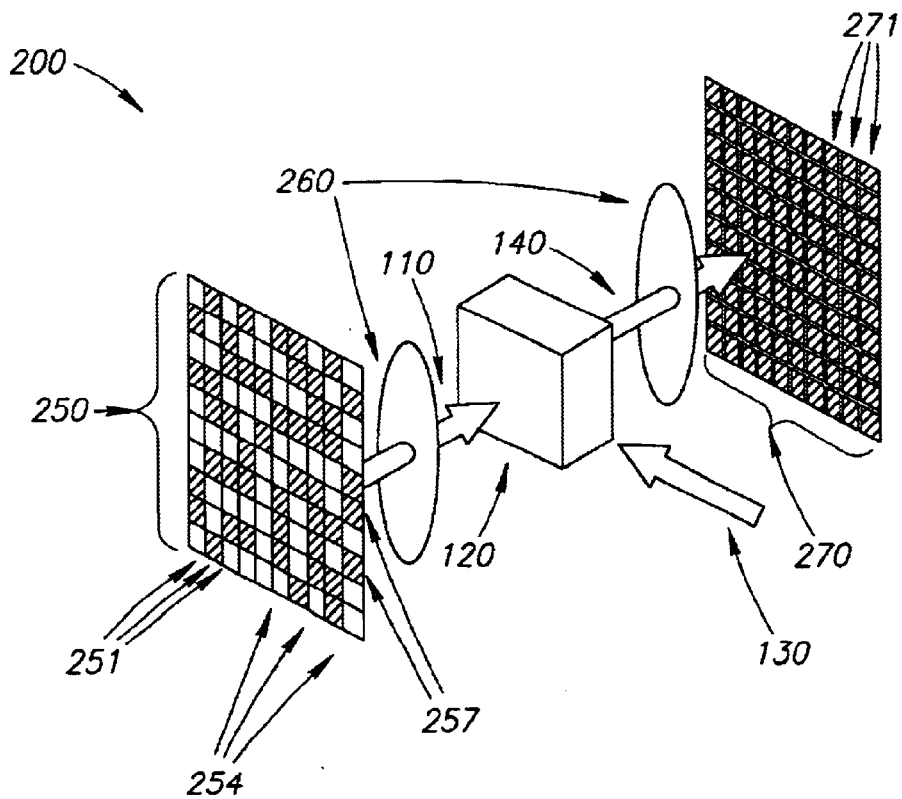
FIG.2
PRIOR ART

METHOD AND APPARATUS FOR TWO-PHOTON, VOLUMETRIC SPATIALLY RESOLVED HOLOGRAPHIC DATA STORAGE IN PHOTOSENSITIVE GLASS

FIELD OF THE INVENTION

The present invention relates to a method and apparatus for providing volumetric, spatially resolved, high-density holographic data storage in photosensitive glass. More particularly, the present invention accomplishes laser storage by two-photon writing and one-photon reading of information stored in a volume of multi-chrome photosensitive glass, under the action of laser pulses having a duration of 100 femtoseconds (fs) or less.

BACKGROUND OF THE INVENTION

Rapid development of the Internet has led to an explosion of information available to users, and to the appearance of new information technologies. This development demands an increase of storage capacity. Conventional magnetic and optical data storage devices and technologies, where individual bits are stored as a dots with changed magnetic or optical properties on the surface of a storage device are approaching the absolute physical limits of capacity. One-photon holographic methods and devices provide for the storage of information in the volume of a medium, not only on the surface, but this conventional holographic method does not allow to the writing of different spatially resolved holograms in the same volume of recording media. That is a limiting factor of conventional one-photon holographic storage devices.

Prior art volumetric storage devices and methods for the writing of information in optically transparent materials, such as glass, crystals and polymers, can be divided in two approaches. The first approach involves the non-linear action of focused electromagnetic radiation on transparent material, leading to changes of the optical properties at a chosen point inside the material. This approach allows the writing of bits of information as dots placed in a volume of optically transparent material. Excessive time is required therein to write and read significant amounts of information.

A method and apparatus for providing a body of material with sub-surface marking in the form of an area of increased opacity to electromagnetic radiation is disclosed in U.S. Pat. No. 5,206,496 issued to Robert M. Clement on Apr. 27, 1993. The method includes directing at a surface of the body a high energy-density beam, to which the material is transparent, and bringing the beam to a focus at a location spaced from the surface, and within the body, so as to cause localized ionization of the material. The main disadvantage in the application to optical storage devices is in being time-consuming for useful quantities of information.

A method of forming images in optically transparent solids under action of focused laser radiation with power density exceeding the optical breakdown threshold is disclosed in Russian Patent RU2008288 issued to S. V. Oshemkov on Feb. 28, 1994. Pulsed or continues-wave laser radiation is focused on the chosen point of optically transparent solid samples to induce breakdown of the material at the focal point. The main disadvantage of this method when applied to optical storage is the relatively large size of the optical breakdown area. The typical area herein, of optical breakdown spots in glass and crystals, is 10 micron or more. This limiting factor reduces the maximal density of written information, and limits the capacity of storage devices based on this method.

A method of stable hole burning in crystals, containing $Sm^{2+}$ as active ions with the purpose of creating narrow holes by laser irradiation, is disclosed in U.S. Pat. No. 5,478,498 issued to N. Kodama, K. Hirao, S. Hara and Y. Inoue on Dec. 26, 1995. Pulsed laser radiation, with a power density insufficient for optical breakdown, is focused in a transparent crystal containing $Sm^{2+}$ as the active ions, which leads to a disordered fluorite-type photochemical hole burning. The main disadvantage of this method is the same as in the preceding methods—excessive time is required to write the information by the forming of spots in the volume.

Methods of using lasers to form small holes or spots with changed optical properties in a bulk of transparent solid dielectric are described in the following two references. J. Qui, et al, in an article entitled Permanent Photo Reduction Of $Sm^{3+}$ To $Sm^{2+}$ Inside A Sodium Aluminoborate Glass By An Infrared Femtosecond Pulsed Laser, //Appl. Phys., Lett. V.74 (1999) pp.10–12, describes the results of experimental observation of permanent photo reduction of $Sm^{3+}$ to $Sm^{2+}$ inside a sodium aluminoborate glass by an infrared femtosecond pulsed laser. After irradiation by an 800 nm-focused femtosecond (fs) pulsed laser, the focused part of the laser in the glass became orange. Absorption, luminescence and electron spin resonance spectra showed the permanent photo reduction of samarium ions after the laser irradiation. The authors indicate that the observed phenomenon is inferred to be useful for the fabrication of optical memory devices with an ultra-high storage density.

Y. Kondo, et al, in an article entitled Three-Dimensional Microscopic Crystallization In Photosensitive Glass By Femtosecond Laser Pulses At No Resonant Wavelength, //Jpn. J. Appl. Phys., V.37, (1998) pp. L94–L96, reported an observation of the three-dimensional microscopic crystallization in photosensitive glass by femtosecond laser pulses at no resonant wavelength. The glass used in the experiments was an aluminosilicate glass containing $Ag^+$ ions and $Ce^{3+}$ ions, in which NaF crystallites could be precipitated using the conventional process. The glass specimens were irradiated with a femtosecond laser of a 630 nm wavelength, not resonant with the $Ce^{3+}$ absorption. The irradiated specimens were heated at 540° C. for 30 minutes, held at 100° C. for 3 hours, and then heated again at 580° C. for 30 minutes to precipitate NaF crystallites. Whether the crystallization occurred or not was evaluated by using an optical microscope and by X-ray diffraction. Due to the use of transparent light and the presence of a threshold for crystallization, it is possible to precipitate micro-crystallites three-dimensionally within the photosensitive glass. The authors indicate that this technique can be applied to create three-dimensionally structured materials such as photonic band gap crystals, which offer unique ways to control the propagation of light. However, both methods of making spots with changed optical properties, by the change of absorption described by Kondo, and the change of refraction herein described, are insufficient to solve the problem of construction of high-density optical storage devices, because these devices may use the holographic methods of writing and reading of information.

The second approach of prior art optical storage devices is the conventional one-photon holographic devices, described in many articles, such as by J. Ashley et al, in Holographic Data Storage, //IBM J. Res. Develop., V.44 (2000), pp.341–366. The main problem of such conventional holographic methods is the lacking of good optical materials, allowing the long-lived writing of information with high-density volume of written information. Y. Kondo, et al, op. cit., indicate that in the case of holographic storage, the response of the recording medium, which converts the optical interference pattern to a refractive index pattern, i.e., a hologram, is generally linear in light intensity and lacks the response threshold found in bistable storage media such as magnetic films. Also, because the standard holographic mediums are linear and reversible, they are subject to erasure during readout or in darkness by thermal processes.

FIG. 1 is a prior art schematic illustration of the method of using holograms to write and read data 100. A hologram is a recording of the optical interference pattern that forms at the intersection of two coherent optical beams. Typically, light from a laser is split into two paths called the object beam 110 and reference beam 130 (FIG. 1a). The beam that propagates along the object path 110 carries the information, while reference beam 130 is used to record and read out the hologram. A plane wave is commonly used as reference beam 130 because it is simple to reproduce at a later stage.

To make the hologram, reference beam 130 and object beam 110 are made to overlap on a photosensitive medium 120, such as a photopolymer or an inorganic crystal, where the resulting optical interference pattern creates chemical and/or physical changes. As a result, a replica of the interference pattern is stored as a change in the absorption, refractive index or thickness of the media. The pattern contains information about both the amplitude and the phase of the two light beams. This means that when the read-out reference beam 135 illuminates the recording, some of the light is diffracted to form a "reconstructed" object beam 140, which is a weak copy of object beam 110 (FIG. 1b). If object beam 110 originally came from a 3-D object, then the reconstructed hologram makes the 3-D object reappear.

If the hologram material is thin, as it is on many credit cards, the read-out beam can differ in angle or wavelength from the reference beam that was used to record the image, and the scene will still appear. However, if the hologram is recorded in a thick material, reconstructed object beam 140 will only appear when read-out beam 135 is almost identical to original reference beam 130. Since the diffracted wave front accumulates energy from throughout the thickness of the storage material, and it is necessary to fulfill phase matching conditions between different parts of the diffracted radiation, a small change in either the wavelength or angle of the read-out beam generates enough destructive interference to make the hologram effectively disappear.

The sensitivity of the holographic reconstruction to changes in wavelength and angle increases with the material thickness, which means that the laser and read-out optics need to be stable and give repeatable results. However, destructive interference also opens up a tremendous opportunity: a small storage volume can now store multiple superimposed holograms, each one distributed throughout the entire volume. The destructive interference allows each of these stored holograms to be independently accessed with its original reference beam. Several different techniques have been developed to define a set of suitable reference beams, for example, by slightly changing the angles wavelength or phase of the original light beam. Using so-called angle multiplexing, as many as 10 000 holograms have been stored in a 1 cm$^3$ volume.

FIG. 2 is a prior art schematic block diagram of the basics of a holographic data-storage system. To use volume holography as a storage technology, digital data must be imprinted onto the object beam for recording and then retrieved from the reconstructed object beam during read out.

The device for putting data into the system is called a spatial light modulator (SLM) 250, i.e., a planar array consisting of thousands of pixels 251. Each pixel 251 is an independent microscopic shutter that can either block or pass light using liquid crystal or micro-mirror technology. Liquid-crystal panels with 1000×1000 pixels and micro-mirror arrays with 1000×800 elements are commercially available due to the success of computer-driven projection displays. The pixels 251 in both types of device can be refreshed over 1000 times per second, allowing holographic data-storage systems to reach input data rates of 1 gigabit per second, assuming that the laser power and material sensitivities permit.

The data are read using an array 270 of detector pixels 271, such as a CCD camera or a semiconductor sensor. Object beam 110 often passes through a set of lenses 260 that image SLM 250 pixel pattern onto output pixel array 270. To maximize the storage density, the hologram is usually recorded where object beam 110 is tightly focused. When the hologram is reconstructed by reference beam 130, a weak copy in the form of reconstructed object beam 140 continues along the imaging path to array 270 of the CCD camera, for example, where the optical output can be detected and converted to digital data.

The speed of a storage device is described by the read-out rate (in bits per second) and the latency, or time delay, between asking for and receiving a particular bit of data. To holographically access stored data, the correct reference beam 130 is preferably directed to the appropriate spot within storage medium 120. The hologram is then reconstructed, and the optical signals processed and decoded to extract the desired digital data. The latency tends to be dominated by mechanical movement, especially if the storage medium has to be moved.

The read-out rate is often dictated by the camera integration time. Reference beam 130 reconstructs a hologram until a sufficient number of photons accumulate to differentiate bright pixels 254 and dark pixels 257. A frequent goal is an integration time of about 1 millisecond, which implies that 1000 pages of data can be retrieved per second. If there are 1 million pixels 271 per data page, and each pixel stores one bit, then the read-out rate is 1 gigabit per second. This goal requires at least 1 Watt of laser power, a high-quality storage material 120, and a detector array 270 that has a million pixels 271 and can be read out at high "frame rates". Frame rates of 1 kHz have been demonstrated in such "mega-pixel" CCD's. Even with these requirements, faster read-out rates and lower latency could be reached by steering the reference-beam angle non-mechanically, by using a pulsed laser and by reading only the desired portion of the detector array.

H. Guenther, et al, in Two-Color Holography In Reduced Near-Stoichiometric Lithium Niobate, //Appl. Opt., V.37 (1998), pp.7611–7623, represents one scheme of writing holograms which are not erased during readout, known as two-color recording. Recording is enabled by simultaneous irradiation of the photo refractive Fe-doped lithium niobate crystals by a gating light beam of different wavelength than the interfering object and reference beams, thereby creating the hologram. This article describes the method of holographic data storage closest to the present invention.

L. B. Glebov et al, in Multi-Chrome Glasses—New Materials For Writing Of Volume Phase Holograms, //Doklady Akademii Nauk, V.314 (1990), pp.849–853, describe the application of the linear photo refractive effect in multi-chrome glasses to the writing of thin holograms. The thin sample of multi-chrome glass was irradiated by UV radiation of a pulsed nitrogen laser. Reading of information formed after thermal processing periodical spatial grating of refractive index was performed at another visible wavelength, by low-power radiation of a He—Ne laser. The diffraction efficiency achieved was about 80%. The disadvantage of the described method is the necessity to use different wavelengths in the writing and reading of holograms, thereby leading to distortion, and it is impossible to read thick holograms, having a high-density of information, in this manner.

Thus there is a need to develop two-photon holographic storage devices with high density of stored information and with the possibility of writing and reading of spatially divided holograms in the volume of the storage device.

SUMMARY OF THE INVENTION

The principal object of the present invention is to develop a two-photon holographic storage device with high density of stored information, and with the possibility of writing and reading of spatially resolved holograms in the volume of the storage device.

It is another object of the present invention is to use the two-photon photo-refractive effect in a holographic device.

It is yet another object of the present invention is to utilize two-photon absorption, which is strongly intensity-dependent, wherein the holographic writing process has a response threshold and, hence, improved stability.

It is still another object of the present invention is to use 100-femtosecond, or shorter, laser pulses in a holographic device, thereby localizing the hologram in an arbitrary chosen part inside the photosensitive material, particularly in multi-chrome glass.

The advantages of the present invention over the above-described conventional manner for solving the problem of optical holographic data storage are:

- the two-photon holographic writing process is substantially intensity-dependent, which prevents erasing of the information by reading at the same wavelength with low intensity;
- two-photon holography allows writing holograms in any chosen part of a photosensitive glass sample, where the intensity of the two intersecting laser beams is maximal; and
- the two-photon method of writing holograms in photosensitive glass allows operation in a transparency region, substantially far from the strong resonant absorption lines of $Ce^{3+}$, thereby allowing reconstruction of thick holograms by using wavelengths in the infrared region, for writing and reading, where the linear absorption in photosensitive glass is negligible. The present invention provides an apparatus for generation of volume spatially-resolved holographic data storage, within a photosensitive glass sample, that incurs changes of optical properties in response to two-photon absorption and subsequent heating to a temperature necessary and sufficient to cause said changes in optical properties. The apparatus includes a pulsed laser beam source having radiation in the near-infra-red region, a device for splitting said pulsed laser beam into an object beam and an reference beam, interferometric equipment for adjusting the optical path of said reference beam, such that said reference beam has an indirect optical path having a difference in length from the the direct optical path of said object beam, in reaching the focal volume, a spatial modulator for imprinting data onto said object beam, a focal volume of the glass sample for storing said data in the form of holograms, a focusing device for focusing said object beam and said reference beam into said focal volume of the glass sample to enable the two-photon absorption, a device for providing a variable time delay to realize the spatially-resolved writing of said holograms and a controller for controlling and activating said pulsed laser beam source, and synchronizing the source with other devices.

Other features and advantages of the invention will become apparent from the following drawings and description.

BRIEF DESCRIPTION OF THE DRAWINGS

For a better understanding of the invention with regard to the embodiments thereof, reference is made to the accompanying drawings, in which like numerals designate corresponding elements or sections throughout, and in which:

FIG. 1 is a prior art schematic illustration of the method of using holograms to write and read data;

FIG. 2 is a prior art schematic block diagram of the basics of a holographic data-storage system;

DETAILED DESCRIPTION OF THE INVENTION

Figure 3:
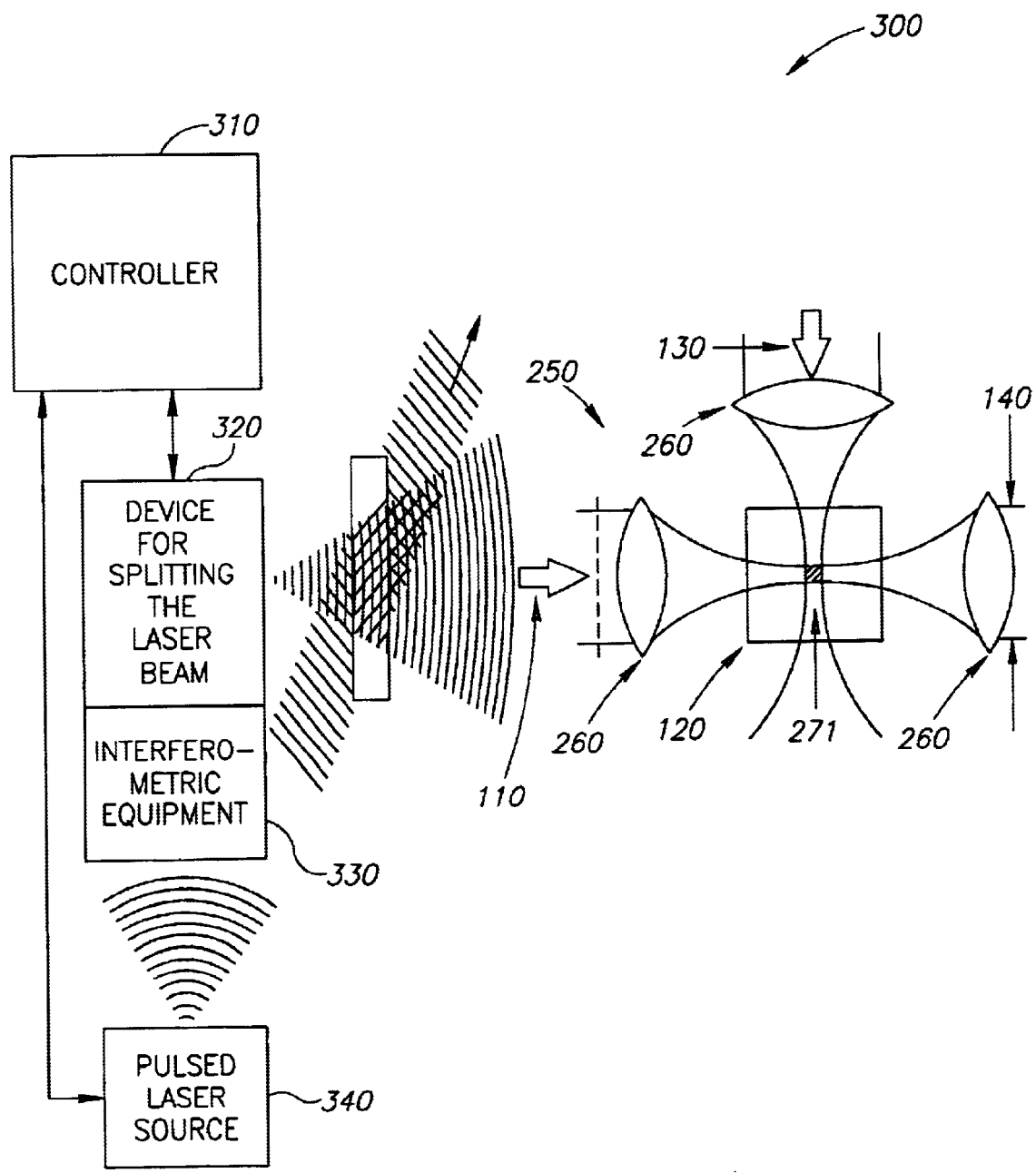
FIG. 3 is a schematic illustration a glass sample with a single point, being illuminated with an object beam and a reference beam, constructed and operated in accordance with the principles of the present invention.

Reference is now made to FIG. 3, which is a schematic illustration of a glass sample with a single point 300, being illuminated with an object beam 110 and a reference beam 130, constructed and operated in accordance with the principles of the present invention.

The apparatus includes a pulsed laser beam source 340 having radiation in the near-infra-red region, a device 320 for splitting the pulsed laser beam into object beam 110 and reference beam 130, interferometric equipment 330 for adjusting the optical path of reference beam 130, such that reference beam 130 has an indirect optical path having a difference in length from the direct optical path of object beam 110, in reaching the focal volume, a spatial modulator for imprinting data onto object beam 110, a focal volume of glass sample 120 for storing data in the form of holograms, a focusing device for focusing object beam 110 and reference beam 130 into the focal volume of glass sample 120 to enable the two-photon absorption, a device for providing a variable time delay to realize the spatially-resolved writing of holograms and a controller 310 for controlling and activating pulsed laser beam source 340, and synchronizing source 340 with the other devices.

The present invention provides for the writing of holograms by using the two-photon photo refractive effect in a multi-chrome glass medium 120. Each of the two non-ultraviolet (UV) intersecting beams is used at one-half the intensity necessary to write, i.e., to achieve significant absorption of incident laser radiation by cerium ions in multi-chrome glass medium 120. It is important to note that the beam cannot be from the UV part of the spectrum, because UV beams make tracks in the photosensitive glass along their way, and absorption of UV light in photosensitive glass is linear.

To achieve writing it is necessary to fulfill two conditions. Firstly, the wavelength of laser radiation must be tuned to the energy of a two-photon transition in cerium ions. It is well known in the art that the maximum of one-photon absorption of cerium ions in multi-chrome glass is localized at about 300–350 nm. Hence, two-photon absorption is most probable at twice the wavelength, i.e., in the infrared (IR) spectral region from 600 to 700 nm. By using a pulsed mode of excitation, two-photon absorption becomes effective if the time duration of the laser pulse is longer than the characteristic time of the two-photon absorption defined by the equation:

$$\tau_2 = (n_p^2 \sigma_2 c^2)^{-1}$$

where
- $n_p$ is the number of incident laser photons per unit volume, i.e., the concentration of photons;
- $\sigma_2$ is the cross-section of two-photon absorption by cerium ions in multi-chrome glass; and
- c is the velocity of light in glass 120.

Experimental estimations given for the cross-section of two-photon absorption under experimental conditions, results in a magnitude of: $\sigma_2 = 10^{-49}$ cm$^4$ sec. The magnitude obtained for the cross-section for two-photon absorption allows estimation of the threshold intensity of laser radiation necessary for achieving significant excitation of cerium ions by two-photon absorption during the laser pulse. Threshold intensity for a 100 femtosecond (fs) laser pulse duration is $10^{12}$ W/cm$^2$, or two orders of magnitude lower than the threshold of optical breakdown at this pulse duration. Reference is made to C. B. Schaffer, et al, in Threshold For Femtosecond Laser-Induced Breakdown In Bulk Transparent Solids And Water, Harvard University, Dept. of Physics, 1999.

For a 1 ns pulse duration, threshold intensity is about $10^{10}$ W/cm$^2$, which is greater than the threshold of optical breakdown at this pulse duration, i.e., $5*10^9$ W/cm$^2$.

Figure 4A:
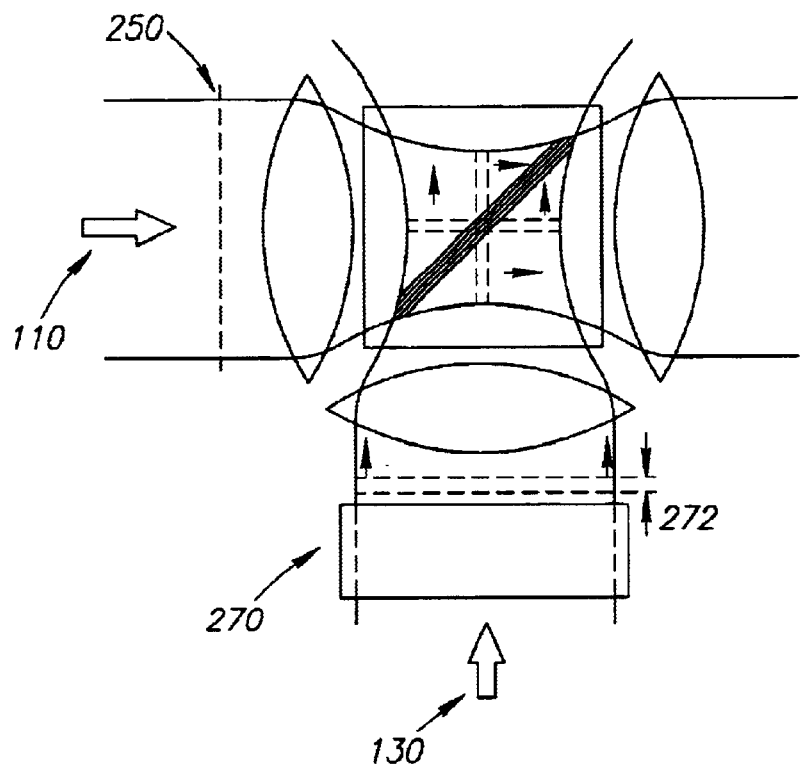
FIGS. 4a and 4b are schematic illustrations of a glass sample, being illuminated with an object beam and a delayed reference beam, constructed and operated in accordance with the principles of the present invention.
Figure 4B:
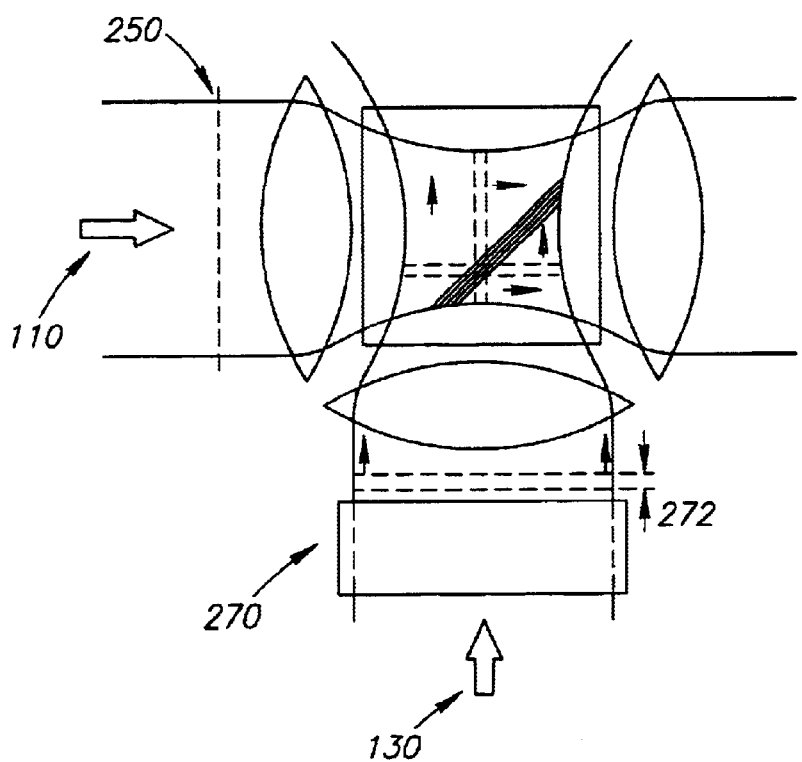

FIGS. 4a and 4b are schematic illustrations of a glass sample being illuminated by two light beams: object beam 110, modulated with data by passing through the spatial light modulator 250; and unmodulated reference beam 130, passed through the variable time delay 270. A pulsed femtosecond laser is used, radiating light pulses of 50 fs duration at a wavelength of 614 nm, with a pulse energy of up to 200 μJ. The pulsed laser radiation is split into spatially modulated object beam 110 and reference beam 130 passing through the variable time delay 270, which are then focused onto the same focal volume in multichrome glass sample 120. The hologram appears in the region of the intersection of the two beams, where the difference of the optical paths of these two beams is no longer than the coherence length 272 of laser radiation. The coherence length 272 of femtosecond laser pulse is 0.015 mm, which is determined by the pulse time duration of 50 fs. Variation of delay time of reference beam 130 by delay line 270 leads to spatial shifting of the region of the intersection within the focal volume where the hologram appears (see FIG. 4b). A typical dimension of the focal volume is determined by the threshold magnitude of laser intensity, which is necessary to achieve two-photon absorption ($10^{12}$ W/cm$^2$ as indicated hereinabove on page 9) is of the order of 0.5 mm. Also variation of the difference between the optical paths of the two beams by delay line 270 is in the range of 0.5 mm, which makes it possible to write different spatially separated holograms, as is shown in FIGS. 4a and 4b.

The number of different spatially resolved holograms which can be written in the same focal volume can be estimated as a ratio of focal volume dimension (0.5 mm) to the coherence length of the femtosecond laser pulse (0.015 mm). Thus, about 30 spatially divided different holograms can be independently written in the same focal volume of multichrome glass. After exposing multi-chrome glass sample 120, a phase hologram is developed by thermal processing, i.e., heating to 400° C. for 30 minutes and then to 500° C. for 30 minutes.

Having described the invention with regard to certain specific embodiments thereof, it is to be understood that the description is not meant as a limitation, since further modifications may now suggest themselves to those skilled in the art, and it is intended to cover such modifications as fall within the scope of the appended claims.

What is claimed is:

1. A method for the generation of stable, volume spatially-resolved holographic data storage within a photosensitive glass sample that incurs changes of optical properties in response to two-photon absorption and heating, said method comprising:

directing pulsed laser radiation at the photosensitive glass sample to induce non-optically observable changes in the glass sample;

splitting of said pulsed laser radiation, prior to reaching the glass sample, into an object beam having a direct optical path of a first predetermined length and a reference beam;

changing the path of said reference beam to have an indirect optical path of a second pre-determined length;

focusing each of said object beam and said reference beam along said respective optical paths, to intersect at a focal volume of the glass sample, and therein to cause the two-photon absorption and primary defects in said focal volume;

providing a variable time delay in said direct path of said object beam so that it reaches the focal volume of the glass sample at the same time as said reference beam; and heating of the sample to a temperature necessary and sufficient to cause the changes of optical properties due to local re-crystallization around said defects, thereby realizing the spatially-resolved writing of very high-density holograms such that about 30 different spatially-resolved holograms can be written and read in the same focal volume, thereby achieving a high density of stored information, wherein said stored information remains stable after being read.

2. The method of claim 1, further comprising the writing and reading of thick holograms in photosensitive glass by two-photon writing and one-photon reading of stored data by near-infra-red (IR) laser radiation.

3. The method of claim 2 wherein said near-IR laser radiation has a wave-length from 600 to 700 nm in the transparency region of the photosensitive glass sample.

4. The method of claim 1 wherein the pulse duration of said pulsed laser radiation is shorter than $10^{-12}$ sec.

5. The method of claim 4 wherein said pulsed laser radiation has a wave-length from 600 to 700 nm in the transparency region of the photosensitive glass sample.

6. The method of claim 4 wherein said pulsed laser radiation has a power density less than the threshold value of the glass volume breakdown for the appointed pulse duration, and sufficient to cause two-photon absorption in the photosensitive glass sample.

7. The method of claim 1, wherein in the focal volume said first optical path of pre-determined length of said direct object beam is different from said second optical path of pre-determined length of said indirect reference beam, such that said difference is no longer than the coherence length of laser radiation.

8. The method of claim 7, wherein said difference of optical paths is provided by use of interferometric equipment.

9. The method of claim 1, wherein the changes of optical properties are changes in the refractive index of the photosensitive glass sample.

10. The method of claim 1, wherein the changes of optical properties are changes in absorption of the photosensitive glass sample.

11. An apparatus for generation of stable, volume spatially-resolved holographic data storage, within a photosensitive glass sample, that incurs changes of optical properties in response to two-photon absorption and subsequent heating to a temperature necessary and sufficient to cause said changes in optical properties, said apparatus comprising:

a pulsed laser beam source having radiation in the near-infra-red region;

a device for splitting said pulsed laser beam into an object beam and a reference beam;

interferometric equipment arranged for adjusting the optical path of said reference beam, such that said reference beam has an indirect optical path having a difference in length from the direct optical path of said object beam, in reaching a focal volume of the glass sample, such that a stable interference pattern is formed;

a spatial light modulator for modulating data onto said object beam;

a focusing arrangement for focusing said object beam and said reference beam to form a focal volume of the glass sample to enable the two-photon absorption, said focal volume of the glass sample for storing said data in the form of stable holograms;

a variable time delay to realize the spatially-resolved writing of said holograms; and a controller for controlling and activating said pulsed laser beam source, and synchronizing the source with other components, such that about 30 different spatially-resolved holograms can be written and read in the same focal volume, thereby achieving a high density of stored information, wherein said stored information remains stable after being read, wherein the apparatus is further provided with a heater for heating the photosensitive glass sample for developing said changes in optical properties.

* * * * *